Nov. 12, 1940.   H. LANGGÄSSER   2,221,144
MEANS FOR CONTROLLING SERVOMOTORS
Filed June 21, 1938
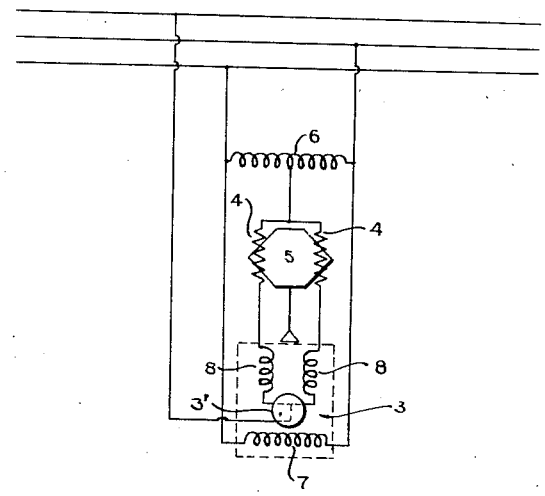
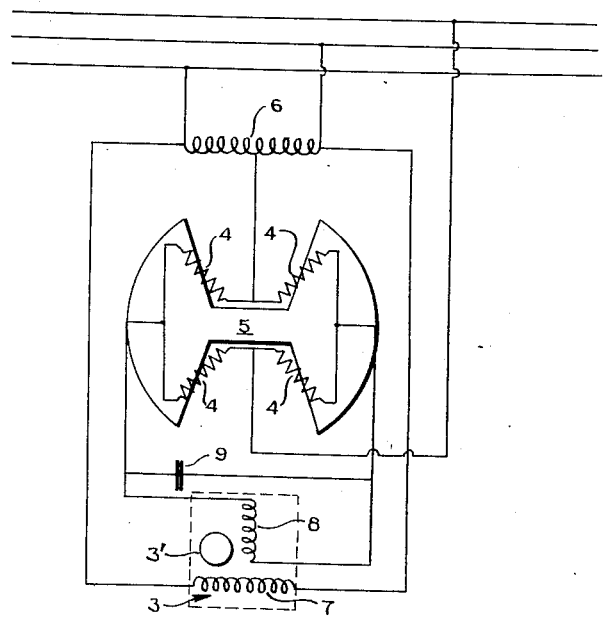
INVENTOR.
Heinrich Langgässer
BY
Stephen Cerotvik
ATTORNEY.

Patented Nov. 12, 1940

2,221,144

UNITED STATES PATENT OFFICE 2,221,144

MEANS FOR CONTROLLING SERVOMOTORS

Heinrich Langgässer, Berlin-Grunewald, Germany, assignor to Siemens Apparate und Maschinen Gesellschaft mit beschränkter Haftung, Berlin, Germany, a corporation of Germany Application June 21, 1938, Serial No. 215,037
In Germany June 25, 1937

1 Claim. (Cl. 172—274)

This invention relates to means for amplifying a control force and more particularly to means for controlling a servomotor.

One of the objects of the present invention is to provide novel means of high sensitiveness for controlling a servomotor.

Another object is to provide novel servomotor control means wherein the servomotor acceleration may be closely governed within wide ranges.

An additional object is to provide novel means for amplifying unusually small control forces.

The above and further objects and novel features will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claim.

In the drawing, wherein like reference characters refer to like parts throughout the several views, Fig. 1 is a schematic diagram illustrating one embodiment of the invention; and, Fig. 2 is a schematic diagram illustrating a second embodiment of the invention.

If only a weak control force is available for producing a movement, for example, for adjusting a control member of an apparatus or for measuring, gauging or indicating purposes, the use of a power amplifier, generally, cannot be avoided. The well-known bolometer has proven very successful as an amplifier because its reaction, if any, upon the control member thereof is extremely small. In connection with the use of such a bolometer for the control of a servomotor for steering, measuring, or gauging devices, etc., the invention concerns an especially simple construction because of the fact that the motor to be controlled is a three-phase motor, the controlled phases of which lie directly in the bolometer circuit.

Of the advantages resulting from this construction, the following should be mentioned: The turning moment of the servo-motor increases steadily toward the positive or negative, as the case may be, in connection with which the desired slope or acceleration can be selected within a wide range. The three-phase (rotary field) motor can be constructed without brushes or slip rings and, therefore, without electrical conducting members containing slots. The motor, therefore, has no distinct "stop position" and, consequently, responds to very minute control impulses. The higher the frequency with which the motor is operated, the quicker will it follow the control impulse.

In the form shown in Fig. 1 for the control of a servomotor 3 having a rotor 3', there are employed bolometer resistances 4, 4, the ohmic resistances of which are governed by the angularly shiftable diaphragm 5. A voltage divider or potentiometer is represented by 6. Winding 7 of the three-phase motor 3 (rotary field motor) lies directly on the circuit in a conventional manner, while the two controlled phases or windings 8, 8 are connected in series with the bolometer resistances 4.

In operation, if the diaphragm 5 assumes a normal middle position the currents flowing in the two auxiliary phases 8, 8 will be equal and opposite and the motor 3 will not rotate. However, if the diaphragm is deflected toward one or the other side, one of the auxiliary phases will be more strongly energized than the other and the motor will rotate with a corresponding moment in a direction determined by the deflection of diaphragm 5.

In the first embodiment, two controlled phases are necessary and, furthermore, these phases are constantly loaded with the current which flows through the bolometer. The embodiment shown in Fig. 2 is a simplification of the first embodiment. Bolometer resistances 4 are arranged in a bridge connection in such a manner that any two opposed resistances are altered a similar amount by diaphragm 5. When said bridge is balanced, the single controlled phase 8 is without current. A condenser 9 is provided to relieve the controlled phase 8 of any reactions therein.

In operation, a current for rotation in a predetermined direction is produced only by deflection of diaphragm 5.

There is thus provided a novel means for controlling a servomotor. The means are highly sensitive to changes in a weak control force, are simple in construction and provide precision control within a wide range of turning moments.

Although only two embodiments of the present invention have been illustrated and described in detail, it is to be expressly understood that the invention is not limited thereto. Various changes may be made in the design and arrangement of the parts without departing from the spirit and scope of the invention, as the same will now be understood by those skilled in the art. For a definition of the limits of the invention, reference will be had primarily to the appended claim.

What is claimed is:

In a device of the character described, a two-phase motor and means for connecting said motor to a three-phase source comprising means for connecting one of said motor phase windings to one phase of said source, a coil connected in parallel to said phase winding, means for connecting one end of the other phase winding to another phase of said source and means connecting the other end thereof to the midpoint of said coil, said means comprising a pair of resistors connected by one end, respectively, to said midpoint, the other ends of said resistors being connected to said phase winding and means including a rotatable diaphragm for continuously differentially varying the effective value of said resistances.

HEINRICH LANGGÄSSER.